(12) United States Patent
Burton et al.

(10) Patent No.: US 6,732,193 B1
(45) Date of Patent: May 4, 2004

(54) METHOD, SYSTEM, AND PROGRAM FOR DETERMINING A NUMBER OF WRITE OPERATIONS TO EXECUTE

(75) Inventors: David Alan Burton, Vail, AZ (US); Robert Louis Morton, Tucson, AZ (US); Erez Webman, Petach-Tikva (IL)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 09/591,023

(22) Filed: Jun. 9, 2000

(51) Int. Cl.$^7$ ................................................. G06F 3/00

(52) U.S. Cl. ................................................. 710/5

(58) Field of Search .................. 710/5, 6, 57; 709/234, 709/235, 233, 238; 711/161, 162

(56) References Cited

U.S. PATENT DOCUMENTS

| | | |
|---|---|---|
| 5,537,533 A | 7/1996 | Staheli et al. |
| 5,544,347 A | 8/1996 | Yanai et al. |
| 5,574,950 A | 11/1996 | Hathorn et al. |
| 5,613,155 A * | 3/1997 | Baldiga et al. ............... 710/5 |
| 5,627,961 A | 5/1997 | Sharman |
| 5,649,196 A | 7/1997 | Woodhill et al. |
| 5,680,580 A | 10/1997 | Beardsley et al. |
| 5,682,513 A | 10/1997 | Candelaria et al. |
| 5,778,420 A * | 7/1998 | Shitara et al. ............... 710/57 |
| 5,802,310 A * | 9/1998 | Rajaraman ............... 709/235 |
| 5,815,649 A | 9/1998 | Utter et al. |
| 5,832,222 A | 11/1998 | Dziadosz et al. |
| 5,845,328 A | 12/1998 | Maya et al. |
| 5,870,537 A | 2/1999 | Kern et al. |
| 5,889,935 A | 3/1999 | Ofek et al. |
| 5,901,327 A | 5/1999 | Ofek |
| 5,920,695 A | 7/1999 | Hathorn et al. |
| 5,933,653 A | 8/1999 | Ofek |
| 5,960,216 A | 9/1999 | Vishlitzky et al. |

FOREIGN PATENT DOCUMENTS

JP 10031561 2/1998

OTHER PUBLICATIONS

U.S. Ser. No. 09/111,626, filed Jul. 7, 1998.
U.S. Ser. No. 09/234,806, filed Jan. 19, 1999.
U.S. Ser. No. 09/591,024, filed Jun. 9, 2000.
U.S. Ser. No. 09/591,016, filed Jun. 9, 2000.
"Method for Improving the Host I/O Performance during Concurrent Copy", IBM Technical Disclosure Bulletin, vol. 37, No. 02A, Feb. 1994, pp. 481–482.
"Remote Copy Link–Level Reconfiguration without Affecting Copy Pairs", IBM Technical Disclosure Bulletin, vol. 38, No. 01, Jan. 1995, pp. 305–306.
"Management of Peer–to–Peer Control Unit Paths", IBM Technical Disclosure Bulletin, vol. 38, No. 09, Sep. 1995, pp. 95–98.
"Performance Improvements through the use of Multi–Channel Command Word", IBM Technical Disclosure Bulletin, vol. 38, No. 09, Sep. 1995, pp. 155–156.
"Bad Response to Establish Pathing Control Frame in Peer–to–Peer Remote Copy Function", IBM Technical Disclosure Bulletin, vol. 38, No. 12, Dec. 1995, pp. 515–517.

(List continued on next page.)

Primary Examiner—Jeffrey Gaffin
Assistant Examiner—Joshua Schneider
(74) Attorney, Agent, or Firm—David W. Victor; Konrad Raynes & Victor LLP

(57) ABSTRACT

Disclosed is a method, system, program, and data structure for executing write operations. A first number of write operations is initiated. Performance data is gathered indicating a total time for a second number of the initiated write operations to complete. After at least one initiated write operation has completed, at least one additional write operation is initiated if a number of outstanding write operations is less than a maximum number of write operations. The maximum number of write operations is adjusted if the performance data meets at least one threshold.

33 Claims, 3 Drawing Sheets

OTHER PUBLICATIONS

"Efficient Management of Remote Disk Subsystem Data Duplexing", IBM Technical Disclosure Bulletin, vol. 39, No. 01, Jan. 1996, pp. 49–51.

"Fixed Storage Allocation of Input–Output Buffers", IBM Technical Disclosure Bulletin, vol. 39, No. 03, Mar. 1996, opp. 75–76.

"Integration of Persistent Memory Data Info Real–Time Asynchronous Direct Access Storage Device Remote Copy", IBM Technical Disclosure Bulletin, vol. 39, No. 10, Oct. 1996, pp. 187–189.

"Single Subsystem PPRC Copy", IBM Research Disclosure, Feb. 1999, p. 264.

* cited by examiner

METHOD, SYSTEM, AND PROGRAM FOR DETERMINING A NUMBER OF WRITE OPERATIONS TO EXECUTE

CROSS-REFERENCE TO RELATED APPLICATIONS

This application is related to the following co-pending and commonly-assigned patent applications, all of which are filed on the same date herewith, and all of which are incorporated herein by reference in their entirety:

"Method, System, And Program For Selecting One of Multiple Paths to Communicate With a Device", to David A. Burton, Robert L. Morton, and Erez Webman, having Ser. No. 09/591,024, and "Method, System, And Program For Remote Copy in an Open Systems Environment" to David A. Burton, Robert L. Morton, and Erez Webman, having Ser. No. 09/591,016.

BACKGROUND OF THE INVENTION

1. Field of the Invention

The present invention relates to a system, method, and program for determining a number of write operations to execute when performing a series of write operations.

2. Description of the Related Art

Data storage systems often include a data protection component that involves creating a back-up copy of data to use in the event of a system failure. One such data protection system involves the use of a computer at a remote site, often referred to as the secondary system, shadowing data storage at a primary site having a primary computer and storage. If there is a system failure at the primary site, then the data can be recovered from the secondary site. One such disaster recovery system that provides data shadowing is the International Business Machines Corporation (IBM) Peer-to-Peer Remote Copy (PPRC) system. In a PPRC system, a primary storage controller provides access to a primary mass storage systems, such as one or more Direct Access Storage Devices (DASDs), comprised of interconnected hard disk drives. The storage controller manages the flow of data from host systems to DASDs. A secondary controller provides a shadow copy of designated volumes in the primary DASD in a secondary mass storage system. A high speed dedicated line, such as Enterprise System Connection (ESCON) channels**, may be used to transfer data from the primary controller to the secondary controller. Another IBM system that provides data shadowing is the Extended Remote Copy (XRC) system.

In PPRC systems, a relationship is established between volumes in the primary DASD and the secondary DASD by copying the designated volumes from the primary DASD to the secondary DASD through the primary and secondary controllers. After the establishment phase, any updates to the protected volumes in the primary DASD are copied over to the secondary controller and DASD to synchronize the data therebetween.

The data recovery relationship cannot begin until all the shadowed primary volumes are copied over to the secondary volumes at the secondary site. For this reason, it is preferable to copy data over as quickly as possible to the secondary controller to complete the establishment phase and commence data shadowing. However, the secondary controller may also be servicing input/output (I/O) requests from host applications to non-PPRC volumes managed by the secondary controller. For this reason, the primary controller typically limits the number of I/O operations so as not to overburden the secondary controller and degrade performance of host applications accessing the secondary controller. In prior art systems, the primary controller will typically perform a fixed number of copy operations that will likely not significantly degrade the performance of host applications also accessing the secondary controller. After the primary controller receives acknowledgment that all the updates have completed, the primary controller will then initiate another set of the fixed number of copy operations until all the primary volumes are copied to secondary volumes in the secondary storage.

One drawback with this approach is that the number of write operations performed remains constant. Thus, even if total utilization of the secondary controller is low, prior art PPRC systems will continue with the same number of fixed copy operations during establishment even though the number of establishment copy operations sent could be increased without adversely degrading the performance of host access requests to the secondary controller.

Thus, there is a need in the art for an improved technique for copying data from one system to another that takes into account the overall load on the system receiving the data to copy.

SUMMARY OF THE PREFERRED EMBODIMENTS

To overcome the limitations in the prior art described above, preferred embodiments disclose a method, system, and program for executing write operations. A first number of write operations is initiated. Performance data is gathered indicating a total time for a second number of the initiated write operations to complete. After at least one initiated write operation has completed, at least one additional write operation is initiated if a number of outstanding write operations is less than a maximum number of write operations. The maximum number of write operations is adjusted if the performance data meets at least one threshold.

In further embodiments, the write operations are part of a series of write operations. In such case, performance data is gathered and adjustments to the maximum number considered each time the second number of write operations are completed while there are further write operations in the series of write operations to perform.

In still further embodiments, the total time for the second number of write operations to complete is compared with a previous best time for the second number of write operations to complete. The maximum number is adjusted if the time for the write operations to complete meets at least one threshold with respect to the previous best time.

Still further, the maximum number is adjusted upward if the total time exceeds the previous best time by a percentage amount. Alternatively, the maximum number is adjusted downward if the total time is less than the previous best time by a percentage amount.

Preferred embodiments provide an improved method, system, and program to determine how many write operations to execute at a time when performing a series of, write operations. Performance data is gathered to determine whether the number of write operations outstanding at any given time should be adjusted. If performance has improved, than the maximum number of outstanding write operations may increase without adversely affecting the performance of other devices accessing the storage. Alternatively, if performance has declined, then the maximum number of outstanding write operations may be adjusted downward to reduce the load on the storage device or storage controller managing the storage device. Preferred embodiments thus provide a method for dynamically adjusting the maximum number of outstanding write operations at one time against a storage device to optimize performance and at the same time avoid adversely affecting the load of the storage device and the performance with respect to other systems that may be accessing the storage.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
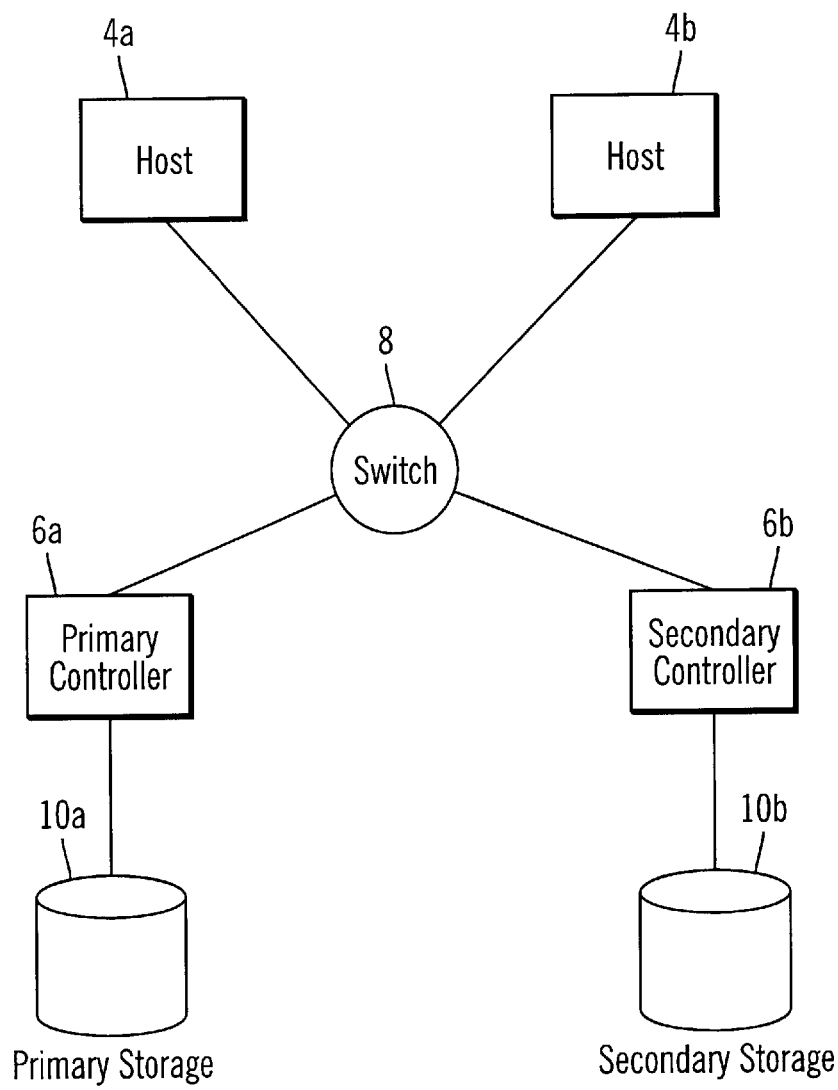
FIG. 1 is a block diagram illustrating a computing environment in which preferred embodiments are implemented.

FIG. 1 illustrates a computing environment in which preferred embodiments are implemented. Hosts 4a, b may comprise any computing device known in the art, including servers through which other client computers can access storage or clients. The hosts 4a, b each include at least one adaptor, such as a Fibre Channel or Small Computer System Interface (SCSI) adaptor card or any other network adaptor card known in the art. The host adaptors allow the hosts 4a, b to communicate with storage controllers 6a, b via switch 8. The switch 8 may comprise the IBM Fibre Channel Storage Hub or Switch, the IBM SAN Fibre Channel Switch, or any other switching device known in the art. A primary site includes a primary controller 6a and primary storage 10a. Designated volumes in the primary storage 10 are transferred to a secondary site comprising a secondary controller 6b and secondary storage 10b. The storage devices 10a, b may comprise a DASD or any other non-volatile storage device and system known in the art.

The primary and secondary controllers 6a, b may include IBM PPRC or XRC software, or other vender shadowing software to allow communication between the controllers 6a, b to coordinate data shadowing. In such embodiments, the controllers 6a, b may comprise large scale storage controllers, such as the IBM 3990 and Enterprise Storage System class controllers. In open system embodiments, the primary and secondary controllers 6a, b may comprise controllers from different vendors of different models, etc., and may not include any specialized protocol software for performing the backup operations. Further, the controllers may include any operating system known in the art, including the Microsoft Corporation Windows and NT operating systems. In such open systems embodiments, the primary controller 6a can use commonly used write commands, such as SCSI write commands, to copy the primary volumes to the secondary volumes in the secondary storage 10b. In open system embodiments, the secondary controller 6b does not need special purpose software to coordinate the shadowing activities with the primary controller 6a as the primary controller 6a accomplishes the shadowing by using standard write commands. In such open systems, the primary and secondary controllers 6a, b may comprise any controller device known in the art and the primary and secondary controllers 6a, b may be of different models and model types, and even of different classes of storage controllers.

As discussed, before the secondary site can start shadowing updates to the primary site, a relationship of primary volumes in the primary storage 10a and secondary volumes in the secondary storage 10b must be established. Each primary volume in the shadow relationship has a corresponding secondary volume at the secondary site that shadows the data in the primary volume. As part of this establishment phase, the primary controller 6a copies the primary volume data to the secondary controller 6b to write to the secondary volumes in the secondary storage 10b.

Preferred embodiments provide a method, system, and program for dynamically determining the number of write operations the primary controller 6a may have outstanding to the secondary controller 6b during the establishment phase to provide the initial mirror copy of the data. Upon completing one write operation, another write operation is issued in its place in order that there always be the maximum number of allowed write operations outstanding. Preferred embodiments provide an algorithm for dynamically determining the maximum number of outstanding write operations that may be initiated in manner that takes into consideration the current load at the secondary controller 6b. One goal is to set the number of outstanding write operations to a value that will avoid degrading the performance of hosts accessing the secondary controller 6b.

Below are variables used in the algorithm for determining the number of outstanding write operations that the primary controller 6a may have at a time against the primary controller 6a.

Command Queue Depth (COD): indicates the number of outstanding write operations the primary controller 6a can have pending, i.e., queued, at any given time against the secondary controller 6b during the establishment phase. After receiving acknowledgment that one write operation has completed, the primary controller 6a will then initiate a new write operation such that the number of outstanding write operations is equal to the command queue depth. This value is adjusted depending on the performance of the secondary controller 6b.

Total Execution Time (TET): accumulates the amount of time to execute and complete n write operations of data from primary to secondary volumes during the establishment phase, where n is a measurement period of write operations for which data is gathered. In this way, the queue depth is recalculated every n executed write operations.

Best Total Execution Time (BTET): contains the lowest total execution time that has been experienced during the current establishment operation to complete n operations Operations Complete (OpComp): counts the number of completed write operations since the last recalculation of the command queue depth. The OpComp variable is reset after performing the n write operations and used again after any adjustments to the CQD.

Operations Outstanding (OpOut): counts the number of write operations currently outstanding at the secondary controller 6b.

In preferred embodiments, the number n of write operations before the command depth queue (CQD) is adjusted is set large enough so that meaningful statistics on the response time of the secondary controller 6b may be gathered. However, it is also desirable to more frequently adjust the command depth queue to provide greater responsiveness to changes in the secondary storage controller 6b load. In the described implementation, n has been set to 128. However, alternative values for n may also be used.

In preferred embodiments, the primary storage controller 6a maintains a control block of data for each initiated write operation. When a write operation is initiated during the establishment phase, a timer is started for that particular write operation in the control block to measure the time from the moment the primary controller 6a transferred the write operation to the secondary controller 6b to when the primary controller 6a received acknowledgment from the secondary controller 6b that the write operation completed.

Figure 2:
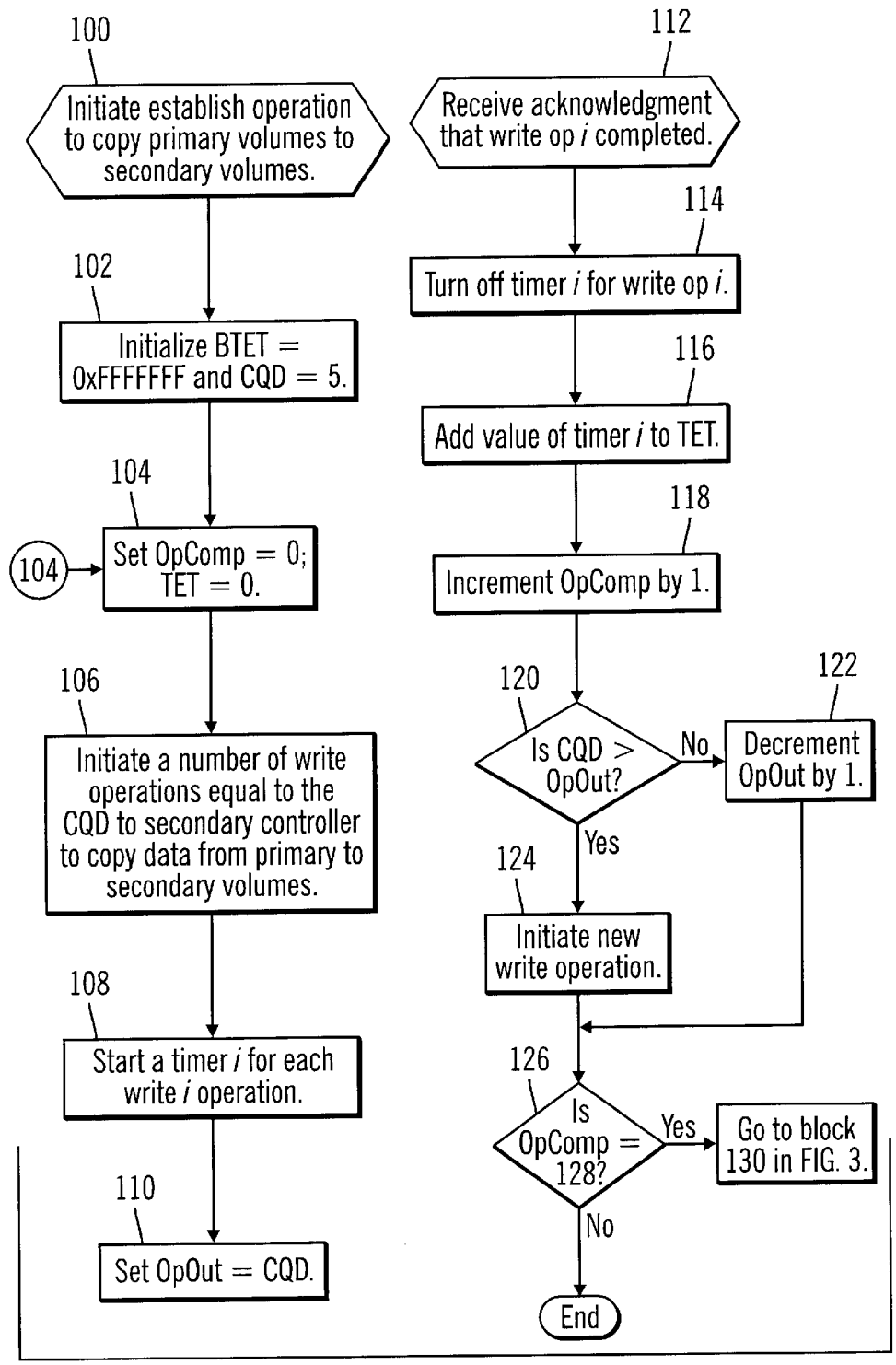
FIGS. 2 and 3 illustrates logic implemented in a controller to execute write operations in accordance with preferred embodiments of the present invention.
Figure 3:
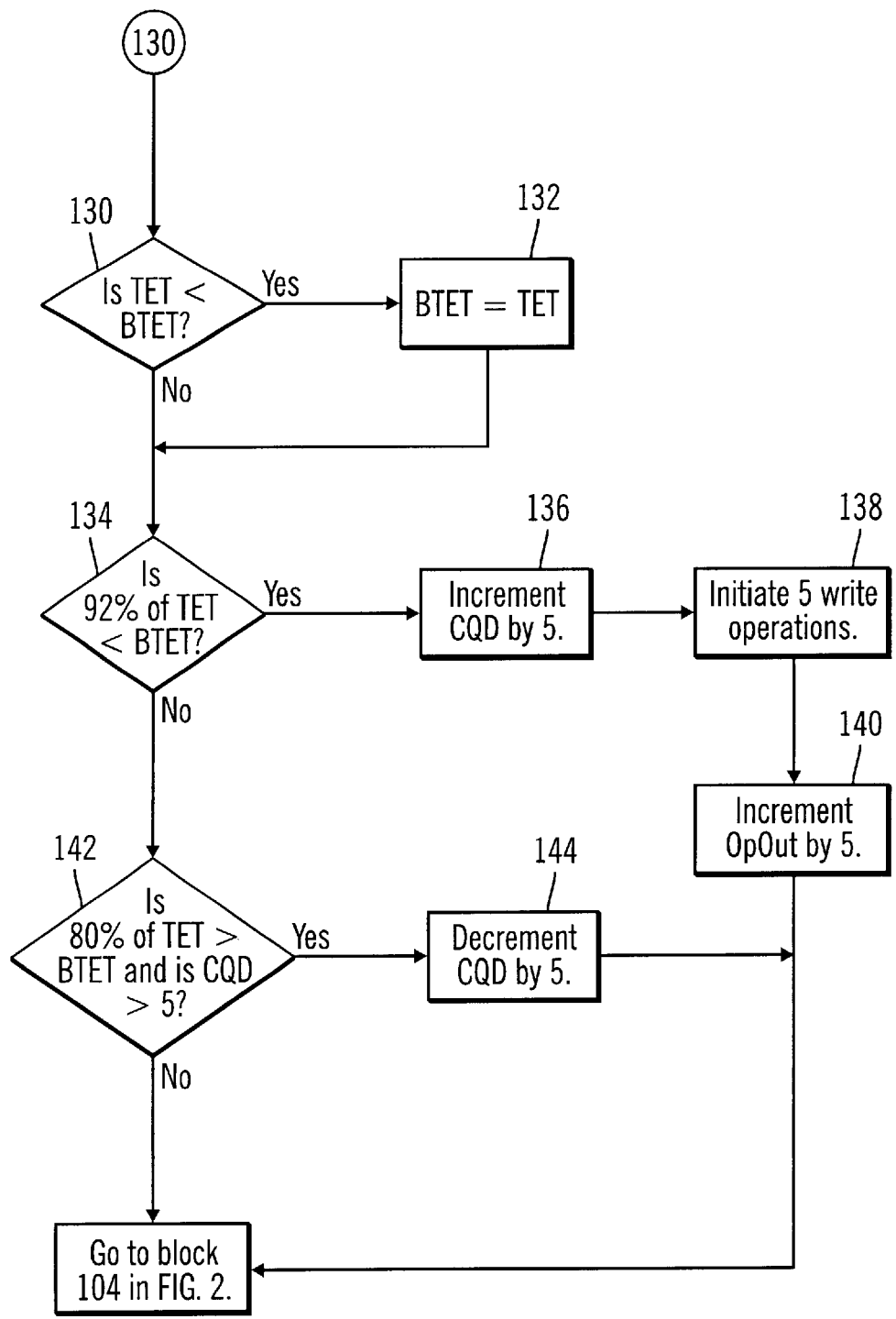

FIGS. 2 and 3 illustrate logic implemented in the primary controller 6a to manage write operations to the secondary controller 6b during the establishment phase where the primary volumes in the primary storage 10a to be shadowed are copied to corresponding secondary volumes in the secondary storage 10b. With respect to FIG. 2, control begins at block 100 with the primary controller 6a initiating the establish operation to copy all of the primary volumes in the primary storage 10a to the secondary volumes in the secondary storage 10b. At the start of the establish session, the primary controller 6a initializes (at block 102) the best total execution time (BTET) variable to a null value (0xFFFFFFFF) and sets the command queue depth (CQD) to five. The initial CQD may be set to some alternative value. Modifications to the CQD value must balance improving performance of the write operations when increasing the CQD with the potential affect of more outstanding write operations on the performance of host applications accessing the secondary controller 6b.

The primary controller 6a performs the operations at 104 to 126 as part of a measurement period for which performance data is gathered in order to determine whether to adjust the number of outstanding operations that are allowed against the secondary storage controller. After performing n write operations at blocks 104 to 126 for the measurement period, the primary controller 6a then determines at block 130–140 whether any adjustments should be made to the command queue depth (CQD) to increase or reduce the number of write operations the primary controller 6a may have outstanding against the secondary controller 6b. At block 104, the primary controller 6a sets the operations complete (OpComp) variable to zero and the total execution time (TET) to zero for the current measurement period. The primary controller 6a then initiates (at block 106) a number of write operations equal to the CQD value to copy primary volume data to the corresponding secondary volume location in the secondary storage 10b. The primary controller 6a then starts (at block 108), in the control block for each initiated write operation i, a timer i to measure how long it takes for the secondary controller 6b to acknowledge completion of write operation i. The operation outstanding (OpOut) variable is set (at block 110) to the CQD value, indicating the number of write operations outstanding to the secondary controller 6b, i.e., writes that have not completed. In this way, the maximum number of write operations outstanding will not exceed the CQD value.

At block 112, the primary controller 6a receives acknowledgment of completion of write operation i. In response, the primary controller 6a stops (at block 114) timer i for write operation i and adds (at block 116) the value of timer i to the total execution time (TET). The primary controller 6a then (at block 118) increments the operation complete (OpComp) variable by one. If (at block 120) the CQD is not greater than the number of operations outstanding (OpOut), then the operations outstanding (OpOut) variable is decremented (at block 122) by one. Otherwise, if the CQD is greater than the OpOut, then a new write operation is initiated (at block 124) as the number of outstanding writes does not exceed the CQD. From blocks 122 or 124, the primary controller 6a determines (at block 126) whether the operation complete (OpComp) variable is 128, i.e., the number of measurements in the collection period. In the described embodiment, n is 128, i.e., data is measured and an adjustment may be made after the completion of 128 write operations. However, alternative values for n may be chosen, with consideration of the tradeoff of improving the measurement statistics versus increasing the responsiveness to changes in the second controller 6b load. If (at block 126), n (e.g., 128) operations have completed, then control proceeds to block 130 in FIG. 3 to determine whether the command queue depth (CQD) should be adjusted. Otherwise, control ends until the completion of another write operation from the secondary controller 6b at block 112.

FIG. 3 illustrates logic implemented by the primary controller 6a to determine whether the command queue depth (CQD) should be adjusted. If (at block 130) the total execution time (TET) is less than the best total execution time (BTET), i.e., performance at the secondary controller 6b has improved, then the primary controller 6a sets (at block 132) the BTET to the TET. During the first measurement period for the establishment session, the BTET would be set to TET as any TET value would be an improvement over the NULL value set at block 102. From block 130 or 132, the primary controller 6a determines (at block 134) whether 92% of the current total execution time (TET) is less than the current best total execution time (BTET), i.e., whether performance at the secondary controller 6b in the current measurement period has improved 8% from the performance during the previous measurement period. If so, then the primary controller 6a increments (at block 136) the command queue depth (CQD) by five. Values other than five and 8% may be used. The CQD is increased because the load at the secondary controller 6b could be increased without substantially degrading the performance of hosts accessing the secondary controller 6b given the recent improved performance of the secondary controller 6b. After adjusting the CQD upwards, the primary controller 6a will then initiate (at block 138) five new write operations because the number of pending write operations can be increased as the CQD is increased. The outstanding operations variable (OpOut) is also incremented (at block 140) by five.

If performance has not improved by 8% (at block 134), then the primary controller 6a determines (at block 142) whether 80% of the current total execution time (TET) is greater than the best total execution time (BTET), i.e., whether performance at the secondary controller 6b in the current measurement period has decreased by 20% (or some other percentage) from the performance during the previous measurement period. The primary controller 6a also determines whether the command queue depth (CQD) can be decremented without falling below some minimal amount as there must be at least a minimum number of write operations queued in the CQD to continue the establishment operations. If both these conditions are met at block 138, then the primary controller 6a decrements (at block 144) the CQD by five (or some other fixed value). From blocks 140, 144 or the no branch of block 142, control returns to the state at block 104 in FIG. 2 to begin a new measurement period and continue the write operations to the secondary controller 6b.

The algorithm of the preferred embodiments optimizes the number of write operations that will be executed against the secondary controller during the establish phase to increase throughput in a manner that does not degrade the performance of other hosts accessing the secondary controller 6b. A low total execution time (TET) relative to the previous best total execution time (BTET) indicates that the load on the secondary controller 6b has decreased. This reduction in loadindicates that the primary controller 6a can increase the number of write operations it has outstanding against the primary controller 6a to speed-up the establishment phase copying without adversely affecting the overall performance of the secondary controller 6b. On the other hand, a higher total execution time (TET) relative to the previous best total execution time (BTET) indicates that the load on the secondary controller 6b has increased to the point that performance has degraded by some significant percent, which is 20% in the above implementation (alternative percent amounts may be used). In such case, the primary controller 6a decreases the number of write operations executed against the secondary controller 6b to reduce the load burden imposed by the establishment operations. Preferred embodiments optimize the time to copy all the primary volumes to the secondary volumes by increasing the number of allowed outstanding write operations when the secondary controller 6b processing capabilities can handle such increased write operations.

In open systems embodiments, the primary controller 6a is able to determine the performance and load of the secondary controller 6b without having to establish a special communication protocol, which would require software on both the primary 6a and secondary 6b controllers, e.g., PPRC and XRC software. Instead, in preferred embodiments, the primary controller 6a may copy the data using standard SCSI commands, and can modify the number of write operations based on acknowledgment information the secondary controller 6b returns under the SCSI protocol. In this way, the secondary controller 6b does not have to know that it is being monitored as the primary controller 6a independently handles the monitoring. In alternative embodiments where the primary 6a and secondary 6b controllers include specialized shadowing software, there may be additional communications to perform the dynamic adjustment of the command queue depth (CQD).

CONCLUSION

The following describes some alternative embodiments for accomplishing the present invention.

The preferred embodiments may be implemented as a method, apparatus or program using standard programming and/or engineering techniques to produce software, firmware, hardware, or any combination thereof. The programs defining the functions of the preferred embodiment can be delivered to a computer via a variety of information bearing media, which include, but are not limited to, computer-readable devices, programmable logic, memory devices (e.g., EEPROMs, ROMs, PROMs, RAMs, SRAMs, etc.) carriers, or media, such as a magnetic storage media, "floppy disk," CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention. Such signal-bearing media, when carrying computer-readable instructions that direct the functions of the present invention, represent alternative embodiments of the present invention.

In preferred embodiments, one primary controller 6a shadowed data on a single secondary controller 6b. However, in alternative arrangements, one primary controller may shadow data at multiple secondary controllers or multiple primary controllers may shadow data at one or more secondary controllers.

The preferred logic of FIGS. 2–3 describe specific operations occurring in a particular order. In alternative embodiments, certain of the logic operations may be performed in a different order, modified or removed and still implement preferred embodiments of the present invention. Morever, steps may be added to the above described logic and still conform to the preferred embodiments. Further, operations described herein may occur sequentially or certain operations may be processed in parallel.

In the described implementations, certain values were used. For instance, a value of five was used for the initial command queue depth (CQD) variable and adjustments were made in increments of five; the threshold for incrementing the CQD was an 8% improvement of performance whereas the threshold for decrementing was 20%; and a measurement period extended for 128 write operations. In alternative implementations, different values may be used in the adjustment determination and operation.

In preferred embodiments, the primary and secondary controllers communicated over a fibre channel interface using SCSI commands. In alternative embodiments, different command protocols may be utilized. For instance, the ESCON protocol may be used for the channel communications and the count-key-data (CKD) protocol may be used for the input/output (I/O) commands.

Preferred embodiments were described with respect to a storage system in which data from a primary site is shadowed at a secondary site as part of a data backup and recovery system. However, the preferred method, system, and program for determining the number of write operations to execute against the remote secondary controller may apply to non-data recovery systems. For instance, the preferred embodiment algorithm for determining the number of write operations to execute at a time, i.e., have outstanding at once, may apply to any situation where one system is performing a consecutive number of write operations against another system. Still further, the algorithm of the preferred embodiments may apply to situations where one system is executing writes against a local storage device, such as a hard disk drive or tape drive, wherein the number of operations that may be outstanding is dynamically adjusted based on the performance of the device executing the write operations.

In summary, preferred embodiments disclose a method, system, and program for executing write operations. A first number of write operations is initiated. Performance data is gathered indicating a total time for a second number of the initiated write operations to complete. After at least one initiated write operation has completed, at least one additional write operation is initiated if a number of outstanding write operations is less than a maximum number of write operations. The maximum number of write operations is adjusted if the performance data meets at least one threshold.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for executing write operations, comprising:

initiating a first number of write operations;

gathering performance data indicating a total time for a second number of the initiated write operations to complete;

after at least one initiated write operation has completed, initiating at least one additional write operation if a number of outstanding write operations is less than a maximum number of write operations; and adjusting the maximum number of write operations if the performance data meets at least one threshold.

2. The method of claim 1, wherein the second number is greater than or equal to the first number.

3. A method for executing write operations, comprising:

initiating a first number of write operations, wherein the write operations are part of a series of write operations;

gathering performance data indicating a total time for a second number of the initiated write operations to complete;

after at least one initiated write operation has completed, initiating at least one additional write operation if a number of outstanding write operations is less than a maximum number of write operations; and adjusting the maximum number of write operations if the performance data meets at least one threshold, wherein performance data is gathered and adjustments to the maximum number considered each time the second number of write operations are completed while there are further write operations in the series of write operations to perform.

4. A method for executing write operations, comprising:

initiating a first number of write operations;

gathering performance data indicating a total time for a second number of the initiated write operations to complete;

after at least one initiated write operation has completed, initiating at least one additional write operation if a number of outstanding write operations is less than a maximum number of write operations;

comparing the total time for the second number of write operations to complete with a previous best time for the second number of write operations to complete; and adjusting the maximum number of write operations if the time for the write operations to complete meets at least one threshold with respect to the previous best time.

5. The method of claim 4, wherein adjusting the maximum number comprises adjusting the maximum number upward if the total time exceeds the previous best time by a percentage amount.

6. The method of claim 5, further comprising initiating at least one additional write operation when adjusting the maximum number upwards.

7. The method of claim 4, wherein adjusting the maximum number comprises adjusting the maximum number downward if the total time is less than the previous best time by a percentage amount.

8. The method of claim 4, further comprising:

setting the best time to the total time if the total time exceeds the best time, wherein the adjusted best time is used when determining whether to adjust the maximum number.

9. A method for executing write operations, comprising:

initiating a first number of write operations;

gathering, performance data indicating a total time for a second number of the initiated write operations to complete by:
  (i) starting a timer for each initiated write operation when the write operation is initiated;
  (ii) adding a time value of one timer to the total time after receiving acknowledgment that the write operation for the timer has completed; and
  (iii) resetting the total time to zero after gathering the performance data for the second number of write operations after at least one initiated write operation has completed, initiating at least one additional write operation if a number of outstanding write operations is less than a maximum number of write operations; and adjusting the maximum number of write operations if the performance data meets at least one threshold.

10. A method for executing write operations, comprising:

initiating a first number of write operations, wherein a controller initiates write operations to copy data from a first storage device to a second storage device;

gathering performance data indicating a total time for a second number of the initiated write operations to complete;

after at least one initiated write operation has completed, initiating at least one additional write operation if a number of outstanding write operations is less than a maximum number of write operations; and adjusting the maximum number of write operations if the performance data meets at least one threshold.

11. The method of claim 9, further comprising:

transferring, with the first controller, the initiated write operations to a second controller, wherein the second controller executes the write operations against the second storage device.

12. A system for executing write operations, comprising:

means for initiating a first number of write operations;

means for gathering performance data indicating a total time for a second number of the initiated write operations to complete;

means for initiating at least one additional write operation if, after at least one initiated write operation has completed, a number of outstanding write operations is less than a maximum number of write operations; and means for adjusting the maximum number of write operations if the performance data meets at least one threshold.

13. The system of claim 12, wherein the second number is greater than or equal to the first number.

14. A system for executing write operations, comprising:

means for initiating a first number of write operations, wherein the write operations are part of a series of write operations;

means for gathering performance data indicating a total time for a second number of the initiated write operations to complete;

means for initiating at least one additional write operation if, after at least one initiated write operation has completed, a number of outstanding write operations is less than a maximum number of write operations; and means for adjusting the maximum number of write operations if the performance data meets at least one threshold, wherein performance data is gathered and adjustments to the maximum number considered each time the second number of write operations are completed while there are further write operations in the series of write operations to perform.

15. A system for executing write operations, comprising:

means for initiating a first number of write operations;

means for gathering performance data indicating a total time for a second number of the initiated write operations to complete;

means for initiating at least one additional write operation if, after at least one initiated write operation has completed, a number of outstanding write operations is less than a maximum number of write operations;

means for comparing the total time for the second number of write operations to complete with a previous best time for the second number of write operations to complete; and adjusting the maximum number of write operations if the time for the write operations to complete meets at least one threshold with respect to the previous best time.

16. The system of claim 15, wherein the means for adjusting the maximum number adjusts the maximum number upward if the total time exceeds the previous best time by a percentage amount.

17. The system of claim 16, further comprising means for initiating at least one additional write operation when adjusting the maximum number upwards.

18. The system of claim 15, wherein the means for adjusting the maximum number adjusts the maximum number downward if the total time is less than the previous best time by a percentage amount.

19. The system of claim 15, further comprising:

means for setting the best time to the total time if the total time exceeds the best time, wherein the adjusted best time is used when determining whether to adjust the maximum number.

20. A system for executing write operations, comprising:

means for initiating a first number of write operations;

means for gathering performance data indicating a total time for a second number of the initiated write operations to complete by:
 (i) starting a timer for each initiated write operation when the write operation is initiated;
 (ii) adding a time value of one timer to the total time after receiving acknowledgment that the write operation for the timer has completed; and
 (iii) resetting the total time to zero after gathering the performance data for the second number of write operations; and means for initiating at least one additional write operation if, after at least one initiated write operation has completed, a number of outstanding write operations is less than a maximum number of write operations; and means for adjusting the maximum number of write operations if the performance data meets at least one threshold.

21. A system for executing write operations, comprising:

a first storage device;

a second storage device; and a controller, wherein the controller performs:
 (i) initiating a first number of write operations to copy data from the first storage device to the second storage device;
 (ii) gathering performance data indicating a total time for a second number of the initiated write operations to complete;
 (iv) initiating at least one additional write operation if, after at least one initiated write operation has completed, a number of outstanding write operations is less than a maximum number of write operations; and
 (v) adjusting the maximum number of write operations if the performance data meets at least one threshold.

22. The system of claim 12, wherein the controller comprises a first controller, further comprising:

a second controller;

means for transferring the initiated write operations from the first controller to the second controller, wherein the second controller executes the write operations against the second storage device.

23. An information bearing medium for executing write operations, wherein the information bearing medium includes code capable of causing a processor to perform:

initiating a first number of write operations;

gathering performance data indicating a total time for a second number of the initiated write operations to complete;

after at least one initiated write operation has completed, initiating at least one additional write operation if a number of outstanding write operations is less than a maximum number of write operations; and adjusting the maximum number of write operations if the performance data meets at least one threshold.

24. The information bearing medium of claim 23, wherein the second number is greater than or equal to the first number.

25. An information bearing medium for executing write operations, wherein the information bearing medium includes code capable of causing a processor to perform:

initiating a first number of write operations, wherein the write operations are part of a series of write operations;

gathering performance data indicating a total time for a second number of the initiated write operations to complete;

after at least one initiated write operation has completed, initiating at least one additional write operation if a number of outstanding write operations is less than a maximum number of write operations; and adjusting the maximum number of write operations if the performance data meets at least one threshold, wherein performance data is gathered and adjustments to the maximum number considered each time the second number of write operations are completed while there are further write operations in the series of write operations to perform.

26. An information bearing medium for executing write operations, wherein the information bearing medium includes code capable of causing a processor to perform:

initiating a first number of write operations;

gathering performance data indicating a total time for a second number of the initiated write operations to complete;

after at least one initiated write operation has completed, initiating at least one additional write operation if a number of outstanding write operations is less than a maximum number of write operations;

comparing the total time for the second number of write operations to complete with a previous best time for the second number of write operations to complete; and adjusting the maximum number of write operations if the time for the write operations to complete meets at least one threshold with respect to the previous best time.

27. The information bearing medium of claim 26, wherein adjusting the maximum number comprises adjusting the maximum number upward if the total time exceeds the previous best time by a percentage amount.

28. The information bearing medium of claim 27, further causing the processor to perform initiating at least one additional write operation when adjusting the maximum number upwards.

29. The information bearing medium of claim 26, wherein adjusting the maximum number comprises adjusting the maximum number downward if the total time is less than the previous best time by a percentage amount.

30. The information bearing medium of claim 26, further causing the processor to perform:

setting the best time to the total time if the total time exceeds the best time, wherein the adjusted best time is used when determining whether to adjust the maximum number.

31. An information bearing medium for executing write operations, wherein the information bearing medium includes code capable of causing a processor to perform:

initiating a first number of write operations;

gathering performance data indicating a total time for a second number of the initiated write operations to complete by:
(i) starting a timer for each initiated write operation when the write operation is initiated;
(ii) adding a time value of one timer to the total time after receiving acknowledgment that the write operation for the timer has completed; and
(iii) resetting the total time to zero after gathering the performance data for the second number of write operations; and after at least one initiated write operation has completed, initiating at least one additional write operation if a number of outstanding write operations is less than a maximum number of write operations; and adjusting the maximum number of write operations if the performance data meets at least one threshold.

32. The information bearing medium of claim 23, wherein a controller initiates write operations to copy data from a first storage device to a second storage device.

33. The information bearing medium of claim 31, further causing the processor to perform:

transferring, with the first controller, the initiated write operations to a second controller, wherein the second controller executes the write operations against the second storage device.

* * * * *

UNITED STATES PATENT AND TRADEMARK OFFICE
CERTIFICATE OF CORRECTION

PATENT NO. : 6,732,193 B1
DATED : May 4, 2004
INVENTOR(S) : David Alan Burton et al.

It is certified that error appears in the above-identified patent and that said Letters Patent is hereby corrected as shown below:

<u>Column 4,</u>
Line 35, delete "Oueue" and insert -- Queue --.
Line 35, delete "COD" and insert -- CQD --.

Signed and Sealed this

Twenty-third Day of May, 2006

JON W. DUDAS
*Director of the United States Patent and Trademark Office*